Nov. 6, 1962   R. CAMUSI   3,062,687
METHOD FOR THE APPLICATION OF STARCH TO FABRICS
Filed Oct. 7, 1960
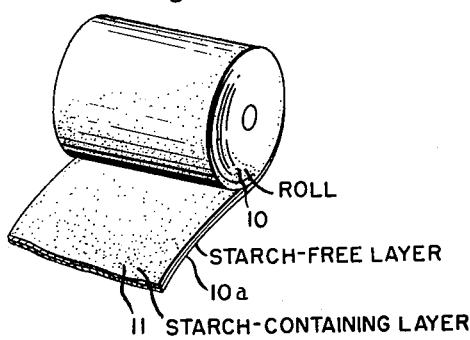
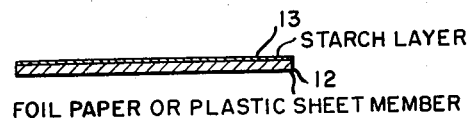
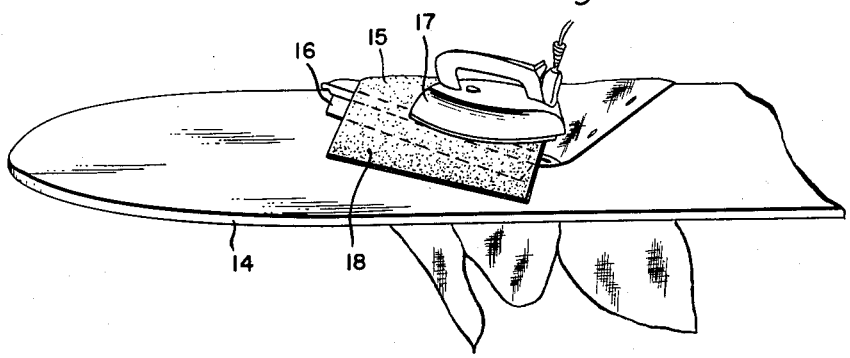
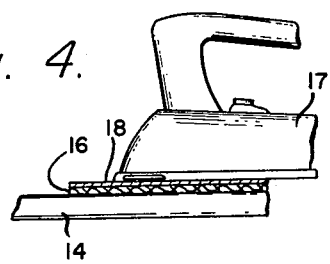
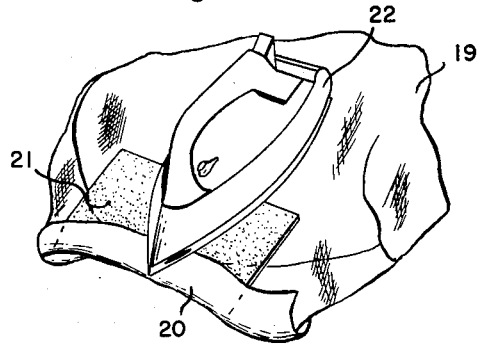
Romaine Camusi,
INVENTOR.
BY.
ATTORNEY.

3,062,687
METHOD FOR THE APPLICATION OF STARCH TO FABRICS

Romaine Camusi, 6914 Woodrow Wilson Drive, Los Angeles 24, Calif.
Filed Oct. 7, 1960, Ser. No. 61,319
2 Claims. (Cl. 117—165)

The present invention relates to a new and improved starching material for the use in the starching of fabrics and to a method for the application of starch thereby.

This application is a continuation-in-part of copending application Serial No. 782,208, filed December 22, 1958, now abandoned.

At the present time, starch is applied to fabrics, and particularly to localized areas, by the impregnation or coating of such fabrics, or areas thereof, with solutions of starch, followed by the application of heat and pressure, as by ironing, to set the starch and stiffen the fabric. This procedure obviously involves preparation of starch solutions and saturation of fabric thus rendering it cumbersome and inconvenient particularly where small areas are to be starched as in the case of collars, cuffs, shirt fronts and the like. Another disadvantage of conventional starching methods is that impregnation of the fabric may incorporate starch in a surface area which is in contact with the skin, as in the case of collars or cuffs, resulting in chafing or irritation particularly where the skin may have an allergic reaction to the starch.

Applicant has discovered that sheet material may be impregnated or coated with starch and that when such sheet material is applied in contact with a fabric surface in the presence of moisture and heat and pressure applied to said sheet material and fabric by ironing or otherwise, a certain proportion of the starch will migrate from the sheet to the adjacent fabric and will result in a starched area corresponding to the area of contact. Such sheet material is obtained by the impregnation of paper, felt, or fabric with starch solutions, or by the application of films or coatings of starch to paper or plastic sheet or film. Such sheet material may thus be coated or impregnated and then dried to form sheets or rolls of material. Segments of such sheet may then be cut off as desired and placed in contact with the desired article or area to be starched, after which a heated iron or pressing platen may be applied over the sheet and fabric while they are in contact to create the desired starched effect. This procedure may be carried out during a conventional ironing or pressing operation or independently thereof, as desired. Applicant has also discovered that the superimposition of an impervious and preferably heat resistant sheet or film over the starch containing layer will improve the penetration of starch and facilitate use of the iron with the product.

It is, therefore, an object of the present invention to provide a novel product for the application of starch in sheet form.

It is a further object of the present invention to provide a novel method for the application of starch to fabric and other material.

It is a still further object of the present invention to provide a novel method for the application of starch to fabric and other materials by the application or ironing pressure and heat to sheet materials having starch associated therewith while in contact with such fabric.

Other objects of the invention will be apparent from consideration of the appended drawings and the specification which follows:

In the drawings:

FIGURE 1 is a view in elevation of a starch-impregnated sheet of material of the invention in roll form.

FIG. 2 is a view in cross section of a starch-coated sheet of the invention.

FIG. 3 is a view in perspective illustrating one manner of application of the sheet material of the invention.

FIG. 4 is a view, partly in elevation and partly in cross section showing in great detail the operation of FIG. 3.

FIG. 5 is a view in perspective illustrating the use of the sheet material of the invention in another manner.

FIG. 1 shows a roll of a sheet member 10 impregnated with starch as shown at 11. This member is preferably of an adsorptive fibrous nature such as paper toweling or similar adsorptive material. Felt or woven fabric may also be utilized but paper is generally much less expensive. In the preferred method of preparing the impregnated sheet material, a starch solution is first prepared and the paper then saturated with it and dried. Thereafter it is cut to size and used when desired in the manner described below. The starch solution is prepared from solubilized starch which has been prepared in the manner known to the art by digestion with dilute acid or by similar treatments. In the case of such cold water soluble starches, the material is passed through a solution of desired concentration and thereafter dried in a drying oven. Saturated or concentrated starch solutions are preferred. The process may be made continuous using elongated sheets of paper or the like and formed into rolls after drying. Conventional starch may be dissolved by boiling in water and the sheet material impregnated by passing it through the hot solution. The paper may be also impregnated with starch in solution, or in the form of dispersed particles during manufacture of the paper itself by incorporating such starch in the slurry from which the paper fibers are deposited. Preferably, one surface of the sheet material 10 is overlaid or covered with a layer of paper or the like 10a which contains no starch. This is for the purpose of protecting the surface of the iron from contamination by the starch. Instead of paper or the like it has been found preferable to use a sheet or film of impervious heat resistant material such as metal foil, particularly aluminum foil. Such material has the advantage that the steam generated by the application of the hot iron to the foil surface cannot penetrate through the foil and must pass through the starch layer and the fabric. At the same time, the foil prevents sticking of the iron and facilitates the passage of the iron over the product. In addition more effective heat transfer occurs.

In the case of coated sheet material as illustrated in FIG. 2, a sheet or film 12 of plastic or paper sheet, or preferably a sheet of metal foil is coated with a layer 13 of starch by spreading roller coating, dipping or other suitable means, using a solution of starch of the type used for impregnation. The coating may also be applied from a slurry, dispersion or suspension of starch.

The procedure in which the starch coated or impregnated material is utilized is illustrated in FIGS. 3 and 4. As shown, a garment 15, such as a shirt or blouse, which is to be ironed is placed over ironing board 14. Collar 16, which is to be starched and ironed is placed down on the board in the manner illustrated, preferably with its inner surface which is not to be exposed and in contact with the skin, faced upward. A piece of the laminated starch impregnated paper 18 is then cut from the roll of FIG. 1 and placed in position over the collar. The size of the paper element is somewhat larger than the collar but is shaped to conform thereto. Prior to ironing, the fabric is moistened, or the paper dampened by dipping in water or passing a wet sponge thereover. Preferably the paper is dipped in water prior to use. If desired, both fabric and paper may be moistened, somewhat greater release of starch being obtained thereby. Heated iron 17 is then passed over the paper, vaporizing the water with the result that steam is formed and with the apparent result that starch is carried from the paper into the fabric by the resultant steam and heated moisture which is present. Preferably as described above, starch-impregnated paper having a protective layer of aluminum foil or the like thereover is used to prevent contamination of the surface of the iron, the paper being used with the protected surface in contact with the iron and the exposed starch containing surface in contact with the fabric. The protective layer may be omitted, particularly where the iron is not applied directly to the paper. Following this treatment, the collar is found to correspond to a conventional starched collar to which light or medium starch has been applied. In the case of coated film or metal foil, a segment of coated sheet is positioned over the moistened collar area with the starch side down and the iron passed over the uncoated side. Results similar to those using impregnated paper are obtained.

In a modified procedure which is illustrated in FIG. 5, garment 19 is positioned on a board, with the collar 20 to be ironed folded over, the starch impregnated or coated sheet 21 being positioned beneath the fabric which is thereby interposed between the iron and the starched sheet. The collar is dampened and the iron 22, passed over it as shown. If desired, the sheet may be moistened in addition to or in place of the fabric.

Best results are obtained by using water soluble starch, but it is found that when using paper coated or impregnated with conventional starch, a certain amount of solubilization and transfer will take place due to the heated moisture developed during ironing.

Other water soluble stiffening means may be utilized instead of starch in the above product, such stiffening means including natural and synthetic gums or resins of a water soluble nature, or similar resins dispersed in water.

The improved product and process described above may be utilized with various alterations and modifications by those skilled in the art without departing from the spirit of the invention as defined in the appended claims.

What is claimed is:

1. A method for the application of starch to fabrics and the like to effect stiffening thereof which comprises positioning a sheet member having starch soluble in hot water incorporated therewith in contact with such fabric, and applying a heated iron thereto with pressure in the presence of moisture whereby starch associated with said sheet member is solubilized and transferred to said fabric.

2. A method for the application of starch to fabrics and the like which comprises applying hot water soluble starch to a sheet member, moistening said sheet member and applying it to a fabric surface, and applying heat and pressure to said sheet member and said fabric whereby said starch is solubilized and transferred from the sheet member to the fabric.

References Cited in the file of this patent

UNITED STATES PATENTS

| | | |
|---|---|---|
| 1,544,994 | Kohn | July 7, 1925 |
| 2,433,285 | Marrone | Dec. 23, 1947 |
| 2,768,096 | Toulmin | Oct. 23, 1956 |
| 2,798,990 | Davis | July 9, 1957 |
| 2,916,398 | Marvin | Dec. 8, 1959 |

FOREIGN PATENTS

| | | |
|---|---|---|
| 526,623 | Great Britain | Sept. 23, 1940 |